United States Patent [19]

Saito et al.

[11] Patent Number: 5,972,252
[45] Date of Patent: Oct. 26, 1999

[54] INJECTION COMPRESSION MOLDING METHOD OF A SPECTACLE LENS AND A SPECTACLE LENS PRODUCED BY USING THE SAME

[75] Inventors: Kiyohiro Saito; Tatsuo Nishimoto; Hiroshi Asami, all of Tokyo, Japan

[73] Assignee: Hoya Corporation, Tokyo, Japan

[21] Appl. No.: 08/758,705

[22] Filed: Dec. 3, 1996

[30] Foreign Application Priority Data

Dec. 4, 1995 [JP] Japan .................................... 7-315406

[51] Int. Cl.⁶ .................................................. B29D 11/00
[52] U.S. Cl. ........................ 264/2.2; 264/328.7; 425/808
[58] Field of Search .............................. 264/2.2, 2.3, 1.1, 264/328.7, 328.8, 328.13; 425/808

[56] References Cited

U.S. PATENT DOCUMENTS

| | | | |
|---|---|---|---|
| 4,184,835 | 1/1980 | Talbot ...................................... | 425/577 |
| 4,364,878 | 12/1982 | Laliberte et al. ......................... | 264/2.2 |
| 4,828,769 | 5/1989 | Maus et al. ............................... | 264/1.3 |
| 4,900,242 | 2/1990 | Maus et al. ............................... | 425/149 |
| 5,415,817 | 5/1995 | Shiao et al. ............................... | 264/2.2 |

FOREIGN PATENT DOCUMENTS

| | | |
|---|---|---|
| 0 339 642 | 11/1989 | European Pat. Off. . |
| 0 380 688 | 8/1990 | European Pat. Off. . |
| 0 244 783 | 2/1991 | European Pat. Off. . |
| 54-148055 | 11/1979 | Japan . |
| 61-66623 | 4/1986 | Japan . |
| 2-26723 | 1/1990 | Japan . |
| 6-9826 | 3/1994 | Japan . |

OTHER PUBLICATIONS

Patent Abstracts of Japan; vol. 18, No. 524 JP 06–182833, Jul. 5, 1994 (5 pages).

George Galic's letter to German Patent Agent dated Nov. 10, 1997 (2 pages); including an Affidavit to the European Patent Office dated Nov. 7, 1997 (7 pages).

SPIE–The International Society for Optical Engineering Reprinted from Ophthalmic Lens Design and Fabrication vol. 1529—Dated Jul. 25–26, 1991 (pp. 13–21) Improved Plastic Molding Technology for Ophthalmic Lens & Contact Lens by George Galic and Steve Maus.

Optical World; Injection–compression moulding of Rx polycarbonate lenses by George Galic (4 pages).

Engel Information; Sandwich Press Injection (10 pages).

*Primary Examiner*—Mathieu D. Vargot
*Attorney, Agent, or Firm*—Flynn, Thiel, Boutell & Tanis, P.C.

[57] ABSTRACT

In an injection compression molding method of a lens, in which a mold is closed to preserve a predetermined compressing margin in a cavity 3 for a lens, molten resin is injected and fed into the cavity 3 for the lens, and compressed for the aforementioned predetermined compressing margin before or after the injection and the feed of the molten resin is completed, the predetermined compressing margin (the degree of slightly opening $S_{(-)}$) for producing a minus lens is molded is defined to be larger than the predetermined compressing margin (the degree of slightly opening $S_{(+)}$) for producing a plus lens is molded. As a result, even when the minus lens is molded, the larger area of the cavity can be ensure and a flow property of the molten resin in the cavity is improved, so that the molten resin reached the inside of the cavity 3 flow through the central portion of the cavity 3 into the peripheral portion, with the result that the appearance of a weld mark in the central portion is avoided.

7 Claims, 9 Drawing Sheets

INJECTION COMPRESSION MOLDING METHOD OF A SPECTACLE LENS AND A SPECTACLE LENS PRODUCED BY USING THE SAME

BACKGROUND OF THE INVENTION

1. Field of the Invention

This invention relates to an injection compression molding method of a spectacle lens, in which the spectacle lens is obtained by injecting, compressing and molding a thermoplastic resin, and a spectacle lens produced by using the injection compression molding method. More specifically, this invention relates to an injection compression molding method of a spectacle lens, being capable of molding a plus lens and a minus lens with high-precision and high-quality, and a spectacle lens produced by using the method.

2. Description of the related art

As a molding method for obtaining a lens from a thermoplastic resin, an injection compression molding method is well-known (e.g.: Japanese Patent Application Laid-open No. Sho 2-26723, Japanese Utility Model Application Publication No. Hei 6-9826 and so on). The spectacle lens, within the range of −4.00 Diopter to −8.00 Diopter of the degree of lens, is preferably used for the molding method.

The injection compression molding method is a method that, in order to obtain uniform high-precise of the configuration by correcting shrinkage of molten resin, the mold is closed to retain a compressing margin in a cavity for lens, and the molten resin is injected to feed into the cavity for lens, and then compressed for the compressing margin to obtain the lens.

Provided that the lens has the different thickness so that the lens is brought about the different thickness when the curvature between the rear face and front face of the lens is different, the lens has two kinds of a plus lens, which the thickness of the central portion is thicker than the peripheral portion, and a minus lens, which the thickness of the central portion is thinner the peripheral portion. Further, the thickness of the lens is different dependent upon a design of an optical lens, for example, an aspherical lens, having approximate 1.50 of index of refraction, can be adjusted to designing values of 4.2 mm of the thickness of the central portion and 1.0 mm of the thickness of the peripheral portion in the case of +2.00 Diopter of the degree of lens, and of 1.4 mm of the thickness of the central portion and 7.9 mm of the thickness of the peripheral portion in the case of −4.00 Diopter of the degree of lens. However, when the above lenses are molded to be compressed under the same conditions, the following disadvantages are produced by the difference of a shape properties.

In the molding of the minus lens, the central portion of the lens is thinner than the peripheral portion thereof, so that the central portion of the cavity has a large flow-resistance. Therefore, the molten resin injected into the cavity hardly flows in the central portion of the cavity, so that the resin flows around from the peripheral portion to the central portion by separately flowing, resulting in a disadvantage that a lot of weld marks are easily produced in the central portion.

Further, in the molding of the plus lens, when the difference between the volume of the cavity and the quantity of the fed molten resin is extremely big, the flow property of the molten resin is reduced, and naturally, a non-fed part is produced, with the result that a flow mark is easily produced on the lens after molding.

It is a object of the present invention to provide an injection compression molding method of a spectacle lens, in which a lens having a different thickness regardless of the shape properties of lens, namely a plus lens and a minus lens, can be molded with a high degree of precision and high quality.

It is another object of the present invention to provide an injection compression molding method of a spectacle lens, in which a plus lens and a minus lens can be efficiently molded from an injecting process to a process for removing from the mold.

It is still object of the present invention to provide a spectacle lens being outstanding for uniform optical properties with a high degree of precision and high quality.

SUMMARY OF THE INVENTION

An injection compression molding method of a spectacle lens according to the present invention, in which a mold is closed to preserve a predetermined compressing margin previously adjusted in a cavity for a lens, formed with an optical insert exchanged as necessary, and a molten resin is injected and fed into the cavity for the lens, and compressed for the predetermined compressing margin at least from at the time before the injection of the molten resin is completed, is characterized by the step of: adjusting the predetermined compressing margin for producing a minus lens having a thinner central portion than a peripheral portion thereof to be larger than the predetermined compressing margin for producing a plus lens having a thicker central portion than a peripheral portion thereof.

Here, the meaning of "at least from at the time before the injection of the molten resin is completed" includes "at the time before the injection is completed" or "after the injection is completed".

In the aforementioned molding method, the predetermined compressing margin for producing the minus lens is adjusted to be larger than the predetermined compressing margin for producing the plus lens, so that the larger space in the cavity can be ensured and the flow properties of the molten resin in the cavity is improved, therefore, in producing the minus lens, the molten resin reaching the inside of the cavity flows through the central portion of the cavity into the peripheral portion without separately flowing. As a result, the appearance of a weld mark in the central portion can be avoided, and sufficient pressurizing force is retained in an intensity lens, resulting in the improvement of transfer properties with the mold. From the reason, regardless of shape-properties of lens, the plus lens and the minus lens can be formed with a high degree of precision and high quality.

In the aforementioned injection compression molding method, it is considered that the predetermined compressing margin for producing the minus lens is needed to be adjusted to be larger than the predetermined compressing margin for producing the plus lens. At the time, the adjustment of the predetermined compressing margin for producing the minus lens carried out by opening the mold for the predetermined compressing margin after the mold is closed from the initial position where the compressing margin in the cavity for lens is maximum until a position where the predetermined margin is disappeared, like the adjustment of the predetermined compressing margin for producing the plus lens, it causes a disadvantage of inferior efficiency as for time from a view of a long distance which the mold is opened for the predetermined compressing margin.

More specifically, in the present invention, the predetermined compressing margin in the case of the plus lens is not large and is defined as less than 0.8 mm, for example, 0.1–0.2 mm is sufficient for a lens having +1.00–+3.00 Diopter.

The predetermined compressing margin for producing the minus lens is defined as 5–15 mm, in spite of dependence on the degree of lens or performance after molding.

In a control for closing the mold, from a view of a structure of a molding apparatus, it takes much time to control the movement from the maximum compressing position to upward at 0.1 mm of pitch because of necessity of sophisticated control, for example, it takes approximate 10 seconds for moving for 5 mm.

But, the movement of the mold from top to bottom is easy, in which it is takes less than one second even for 15 mm.

Therefore, in the injection compression molding method of the spectacle lens according to the present invention, the adjustment of the predetermined compressing margin for producing the plus lens is carried out by opening the mold at the predetermined compressing margin after the mold is closed from the initial position where a compressing margin in the cavity for the lens is maximum until a position where the compressing margin is disappeared; and the adjustment of the predetermined compressing margin for producing the minus lens is carried out by closing the mold from the initial position where the compressing margin in the cavity for the lens is maximum until a position where the predetermined compressing margin is preserved.

By adjusting as described above, the predetermined compressing margin for producing the minus lens can be adjusted by closing the mold from the initial position where the compressing margin in the cavity for lens is maximum until the position where the predetermined compressing margin is preserved, namely, the operation in which the mold is opened for the compressing margin as a long distance is not needed, resulting in the swift adjustment of the predetermined compressing margin with a high degree of precision.

Further, the predetermined compressing margin for producing the plus lens can be adjusted by opening the mold for the predetermined compressing margin of a short distance after the mold is closed from the initial position where the compressing margin in the cavity for lens is maximum until the position where the compressing margin is disappeared, resulting in the swift adjustment of the predetermined compressing margin with a high degree of precision as in the case of the minus lens.

In the aforementioned injection compression molding method, the predetermined compressing margin for producing the minus lens is defined to be larger than the predetermined compressing margin for producing the plus lens, so that the flow of the molten resin is stopped while a large non-fed part is retained in the cavity for lens at the time the injection of the molten resin is completed, therefore, it is considered to occur a disadvantage that feed history of resin, called as a flow mark, is easily appeared in a critical portion of the fed portion and the non-fed portion in the molded lens after the pressurizing process.

For the above points, the injection compression molding method of the spectacle lens according to the present invention can further improve the flow properties and the transfer properties of the resin by starting compressing for the predetermined compressing margin for producing the minus lens before the injection of the molten resin is completed, and starting compressing for the predetermined compressing margin for producing the plus lens after the injection of the molten resin is completed.

That is to say, when the minus lens is molded, the compression for the predetermined compressing margin is started before the injection of the molten resin is completed and the volume of the cavity for lens becomes smaller, so that the flow properties of the molten resin is improved, therefore, the large non-fed part is not much retained in the cavity for lens at the time the injection of the molten resin is completed, resulting in avoidance of the appearance of the flow mark.

Here, provided that, in producing the minus lens, a spure, a runner, and the cavity for the lens are to be a sealed space just after the injection of the molten resin is completed, further in producing the plus lens, the spure, the runner, and the cavity for lens are to be a sealed space before the compression for the predetermined compressing margin is started, the molten resin does not back-flow to out of the spure, the runner and the cavity for lens although the molten resin in the cavity for lens is pressurized by the compression, resulting in the lens superior to the transfer properties of the mold, without a striae, feed history or the like, and with a high degree of precision and high quality.

Further, an injection compression molding method of a spectacle lens according in the present invention, in which a movable die, opening from and closing to a corresponding stationary die, is structured with a die fitting member and die body, attached to the die fitting member to move toward the stationary die, an insert is provided in the die body to be inserted to form a cavity, and a holding member, holding the insert, is constantly abutted in an opposite direction to the stationary die to be in contact with the die fitting member by being supplied with elastic urging force of an elastic member, so that a mold is closed by advancing the die fitting member toward the stationary die to preserve a predetermined compressing margin, previously adjusted in the cavity of the lens, a molten resin is injected and fed into the cavity for the lens, and compressed for the predetermined compressing margin by advancing the die fitting member toward the stationary die at least from at the time before the injection of the molten resin is completed, after that, the die fitting member is retreated, the holding member is moved to be pushed toward the stationary die with an eject pin inserted in the die fitting member after separating the movable die from the stationary die, and then a lens-molding is pushed out by the insert, it is characterized by the steps of: adjusting the predetermined compressing margin for producing a minus lens, having the thinner central portion than the peripheral portion, to be larger than the predetermined compressing margin for producing a plus lens, having the thicker central portion than the peripheral portion; moving the holding member to be pushed toward the stationary die by the eject pin when the die fitting member is retreated; advancing the insert toward the stationary die relatively to the die fitting member; separating the movable die from the stationary die; and pushing the lens-molding out with the insert in accordance of a movement of the holding member pushed by the eject pin.

According to the above molding method, the following effects are expected, in addition to the effect that the plus lens and the minus lens, regardless of the shape-properties of lens, can be formed with a high degree of precision and high quality to avoid appearing the weld in the central portion.

That is to say, the holding member is moved to be pushed toward the stationary die by the eject pin when the die fitting member of the movable die is retreated, thereby the insert is advanced toward the stationary die relatively to the die fitting member of the movable die, so that the space, having the same degree as the degree of the retreating movement of the die fitting member, is not formed between the lens-molding in the cavity and the insert, therefore, the compressed air can be controlled to produce excessively, and the influence of the pressure of the compressed air upon the lens-molding can be avoided, resulting in the molding having the high precision of molding, without parts of molded in the spure or the runner are bent or fault brought when the molding is removed from the mold, such as the displacement of the molding to the mold is produced.

Here, when the insert is advanced toward the stationary die relatively to the die fitting member of the movable die by moving the holding member to be pushed by the eject pin when the die fitting member of the movable die is retreated, the degree of the advancing movement may be the same as the degree of the retreating movement (the degree of slightly opening) of the die fitting member, and may be larger than the degree of the retreating movement, but it is preferable to be smaller.

Provided that the degree of the advancing movement is defined to be smaller than the degree of the retreating movement, the space can be formed between the insert and the lens-molding, so that the lens-molding does not fall from the cavity even when the movable die is separated from the stationary die, with the result that the lens-molding is prevented from damage caused by falling. Especially, it is advisable that the space between the insert and the lens-molding is formed at 1–4 mm. The space formed at less than 1 mm causes the fall of the lens-molding upon occasion, and the space formed at more than 4 mm causes inferior effect of controlling to excessively produce the compressed air.

More specifically, release of clamping force after closing the mold is rapidly and greatly retreated for the compressing margin adjusted large, so that, especially, the conditions (mainly, temperature) for molding the convex face of the lens are greatly changed. Therefore, phenomenons, for example, fault, brought when the molding is removed from the mold, arises by strongly exerting force of removing from the mold on a part of the lens or the spure or the runner is broken, occur.

Hence, by providing a mid-ejecting function with the adjustment of the aforementioned space, it is avoided that the partially strong force of removing from the mold is excessively exerted on a part of the molding. Especially, when the plus lens is molded, the strength of the connecting part with the runner is not strong in structure for the thinner peripheral portion of the lens, so that the aforementioned ejecting method is effective.

A spectacle lens, obtained by using the injection compression molding method of a spectacle lens according to the present invention, in which a mold is closed to preserve a predetermined compressing margin previously adjusted in a cavity for a lens, formed with an optical insert exchanged as necessary, and a molten resin is injected and fed into the cavity for the lens, and compressed for the predetermined compressing margin at least from at the time before the injection of the molten resin is completed, is characterized by being produced by the following injection compression molding method of adjusting the predetermined compressing margin for producing a minus lens having the thinner central portion than the peripheral portion to be larger than the predetermined compressing margin for producing a plus lens having the thicker central portion than the peripheral portion.

Here, the lens is the spectacle lens having a meniscus-shape.

DETAILED DESCRIPTION OF THE PREFERRED EMBODIMENT(S)

Figure 1:
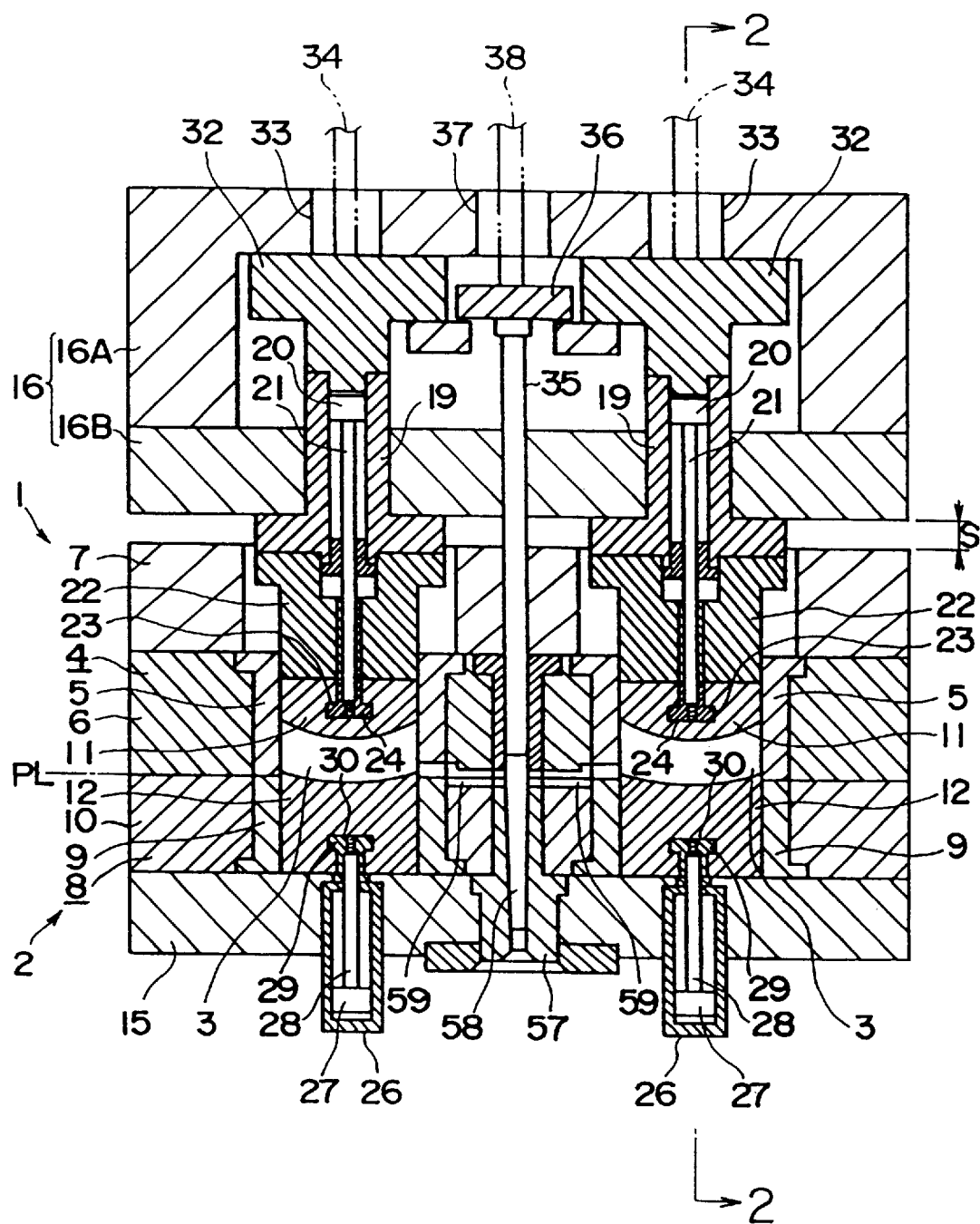
FIG. 1 is a sectional view showing a mold for molding with injection and compression according to a preferable embodiment of the present invention.
Figure 2:
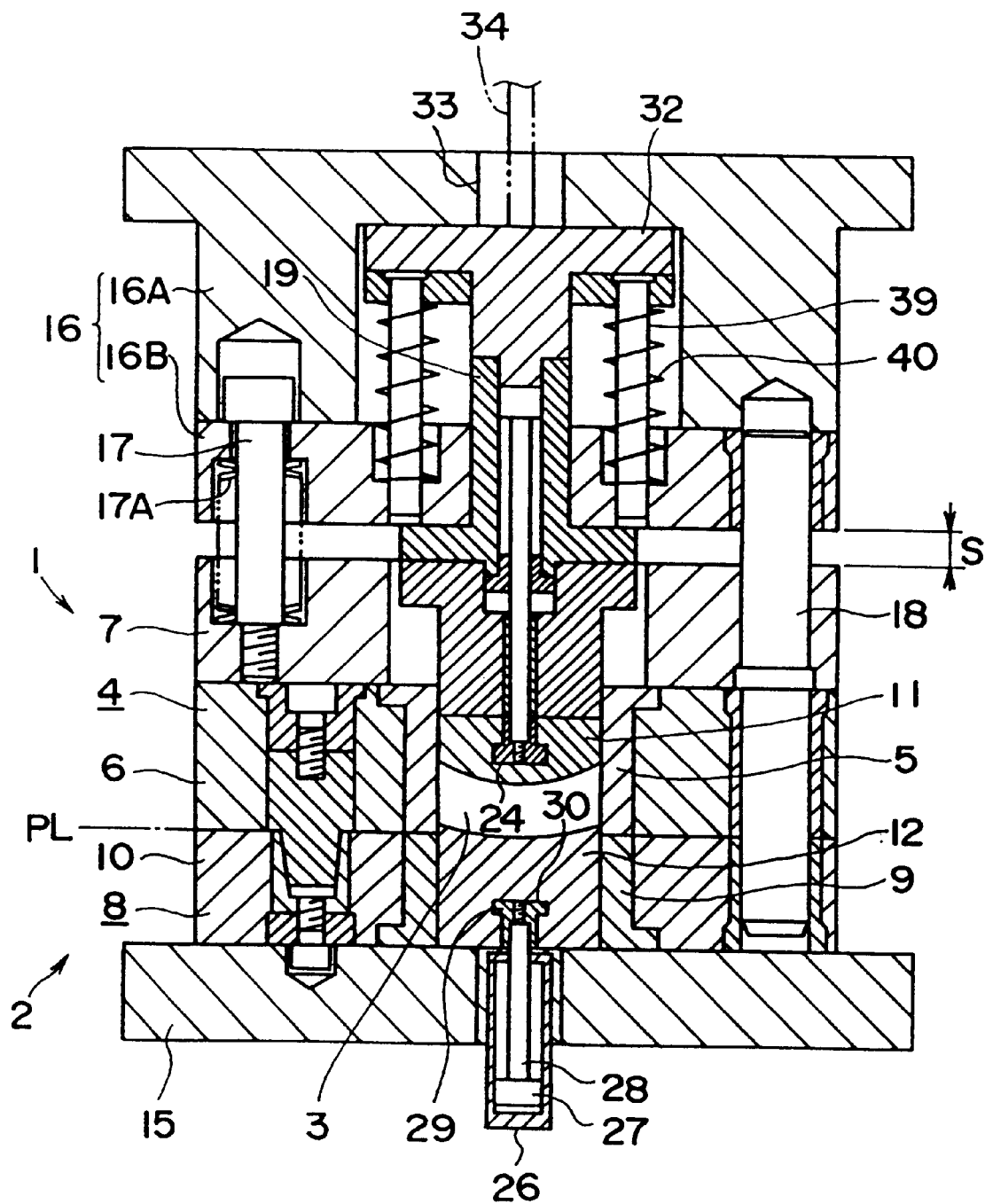
FIG. 2 is a sectional view taken along the II—II line in FIG. 1.

The preferred embodiment according to the present invention will be explained in detail below with reference to the attached drawings. FIG. 1 is a sectional view of a mold for molding with injection and compression which is used in an injection compression molding method of a spectacle lens (a spectacle lens having a meniscus shape; fixed focus, multifocus, progressive multifocus) according to the embodiment, and further FIG. 2 is a sectional view taken along the II—II line in FIG. 1. Incidentally, materials of the spectacle lens molded here is a thermoplastic resin, such as PMMA (poly methyl methacrylate), PC (polycarbonate) or the like. In the embodiment, in order to prevent striae, optical distortion or the like, the injection is carried out at low output.

As shown in FIG. 1, the aforementioned mold for molding with the injection and compression is a mold for molding two lenses, in which cavities 3 for the two spectacle lenses are formed between a upper die 1 and a lower die 2, caused by dividing the mold in the vertical direction at a parting line PL.

The upper die 1, which is a movable die opening and closing for the lower die 2 as a stationary die in the vertical direction, includes a die fitting member 16 and a die body 4 attached to the die fitting member 16 to be able to move toward the lower die 2. In turn, the die fitting member 16 is composed of a upper member 16A and a lower member 16B. the die body 4 is composed of an insert guide 5 and die plates 6 and 7.

The lower die 2 includes a die body 8, composed of an insert guide 9 and a die plate 10, and a die fitting member 15 for attaching the die body 8.

Inside of each of the insert guides 5 and 9, inserts 11 and 12 forming the cavity 3 are held to be capable of sliding in a direction at right angles to the parting line PL.

The die body 4 of the upper die 1 is connected to the die fitting member 16 with a bolt 17 shown in FIG. 2, and a plate spring 17A, inserted on the outer circumference of the bolt 17, is provided to connect between the die body 4 and the die fitting member 16. Incidentally, the die fitting member 16 is adopted to be moved in the vertical direction by a clamping cylinder (not shown).

A space S is formed between the die body 4 and the die fitting member 16, in which the die body 4 and the die fitting member 16 are opened and closed at the space S in the vertical direction while being guided with a guide pin 18. A slightly opening cylinder (not shown) is arranged downward the die fitting member 15 to cause the die fitting member 16 to lift up in opposition to clamping force caused by the clamping cylinder, thereby the space S is formed.

A hydraulic cylinder 19, placed with the bottom up, is provided in the die fitting member 16 to move in the vertical direction. A piston rod 21, connected to a piston 20 of the hydraulic cylinder 19, is passed through a back insert 22 fixed on the lower face of the cylinder 19 and provided with a T-shaped clamping member 23 at the end of the piston rod 21. The T-shaped clamping member 23 is detachably engaged with a T-shaped groove formed on the upper end face of the insert 11.

A hydraulic cylinder 26, placed with the top down, is provided in the die fitting member 15. A piston rod 28, connected to a piston 27 of the hydraulic cylinder 26, is passed through the die fitting member 15 and includes a T-shaped clamping member 29 at the end. The T-shaped clamping member 29 is detachably engaged with a T-shaped groove formed on the lower end face of the aforementioned insert 12.

On the upper end of the aforementioned hydraulic cylinder 19, a pressure receiving portion 32 is fixed. Whereupon the pressure receiving portion 32 is pushed down by an eject pin 34 inserted from a hole 33 formed in the die fitting member 16, the hydraulic cylinder 19, the back insert 22 and the insert 11 are also pushed down, thereby a lens-molding molded in the cavity 3 is pushed out when the upper die 1 is opened from the lower die 2. In the aforementioned portion, a holding member, for holding the insert 11 by the back insert 22, the hydraulic cylinder 19 and the pressure receiving portion 32, is structured.

At the central portion of the die fitting member 16 of the upper die 1, an eject bar 35 is arranged to be able to move in the vertical direction. On the upper end of the eject bar 35, a pressure receiving portion 36 is fixed. Whereupon the pressure receiving portion 36 is pushed down by an eject pin 38 inserted from a hole 37 formed in the die fitting member 16, the eject bar 35 is pushed down.

To the pressure receiving portion 32, spring force caused by a spring 40, wound on the outer circumference of an eject return-pin 39, acts upward. Incidentally, spring force caused by a spring (not shown), wound on the outer circumference of an eject return-pin, acts upward to the pressure receiving portion 36. Therefore, provided that the eject pins 34 and 38 are lifted up, the pressure receiving portions 32 and 36 are also lifted up to return to original positions. In the aforementioned portion, a holding member, structured with the back insert 22, the hydraulic cylinder 19 and the pressure receiving portion 32, is abutted to die fitting member 16 to be supplied with elastic urging force in the opposite direction to the lower die 2 by the spring 40 as an elastic member all the time.

Operation in the embodiment will be explained below.

First, responsive to kinds of lens intended to be molded, the inserts 11 and 12 are changed. When the inserts 11 and 12 are changed, the upper die 1 including the die fitting member 16 is lifted up to separate from the lower die 2. Further, by lifting the piston rod 21 of the hydraulic cylinder 19 down and lifting the piston rod 28 of the hydraulic cylinder 26 up, the T-shaped clamping members 23 and 29, attached at the end of the piston rods 21 and 28, are projected from the insert guides 5 and 9.

The inserts 11 and 12, newly placed to the die bodies 4 and 8 of the upper die 1 and the lower die 2, are horizontally delivered while being held with arms of a robot (not shown), the T-shaped grooves 24 and 30 of the inserts 11 and 12 are engaged with the T-shaped clamping members 23 and 29. After that, the piston rod 21 of the hydraulic cylinder 19 is lifted up to pull the insert 11 up, and the piston rod 28 of the hydraulic cylinder 26 is lifted down to pull the insert 12 down. As a result, the inserts 11 and 12 are inserted into the insert guides 5 and 9.

Figure 4:
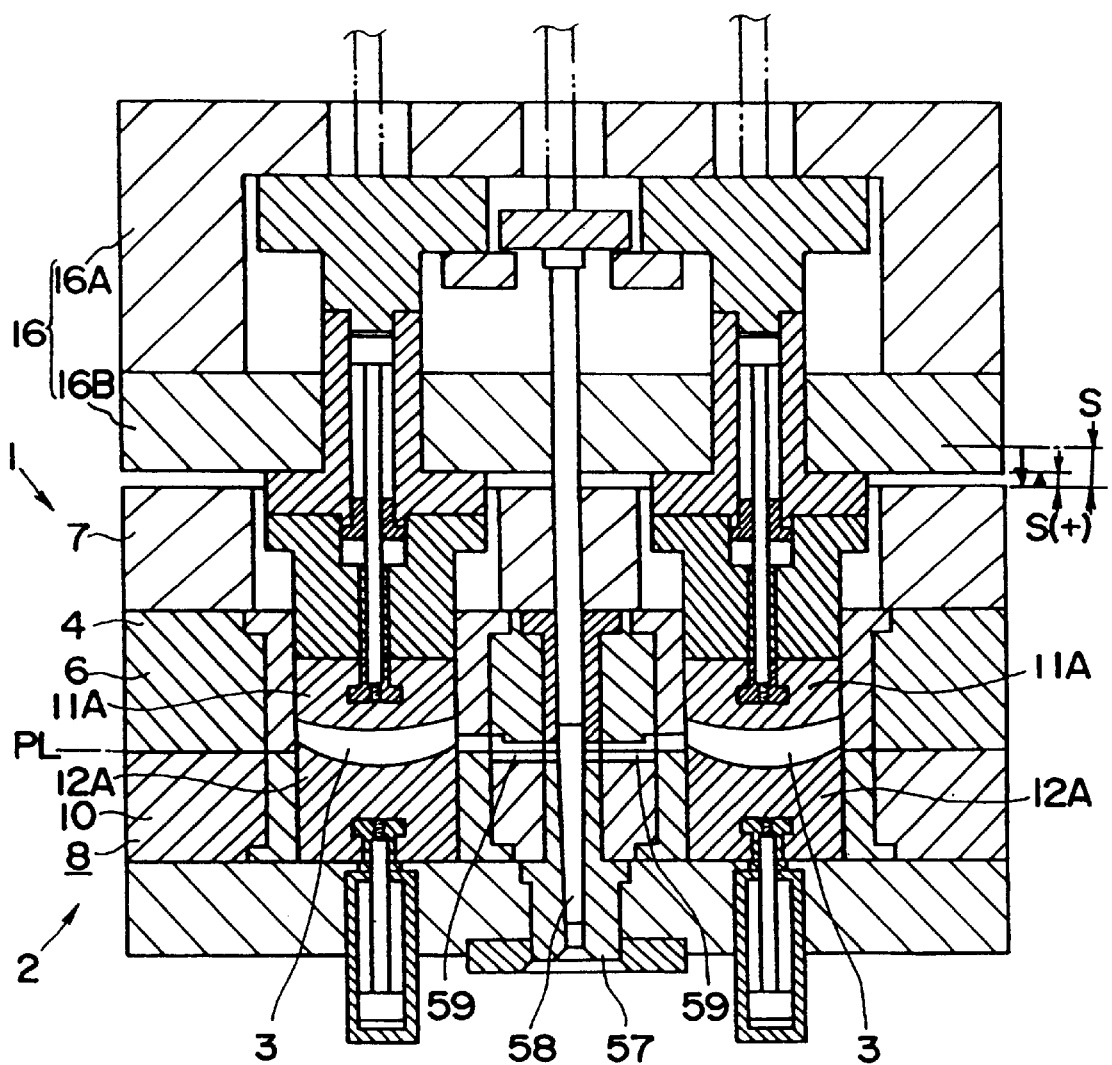
FIG. 4 is a drawing showing a state before molten resin is injected and fed when a plus lens is formed in the above embodiment.
Figure 5:
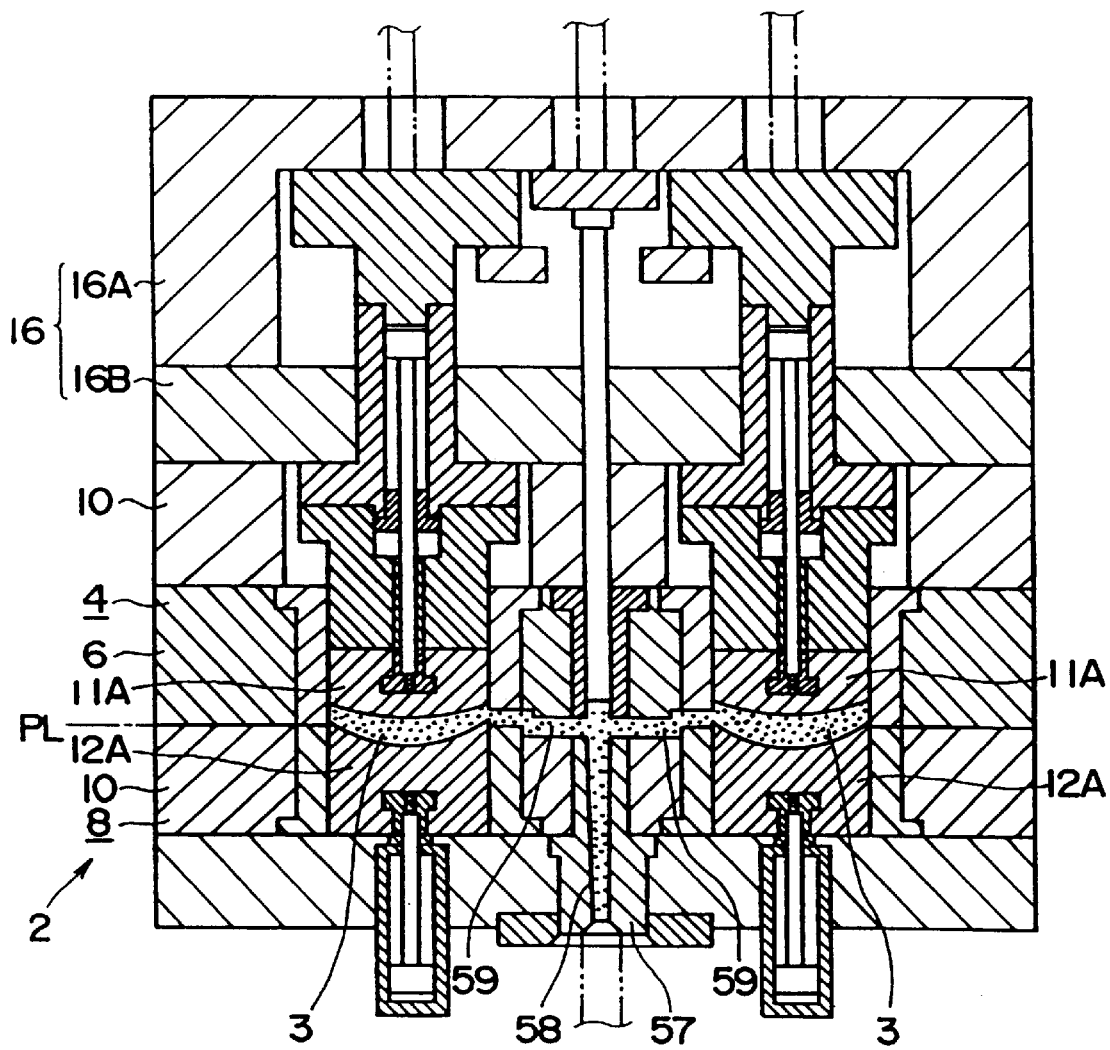
FIG. 5 is a drawing showing a state after the molten resin is compressed when the plus lens is formed in the above embodiment.
Figure 6:
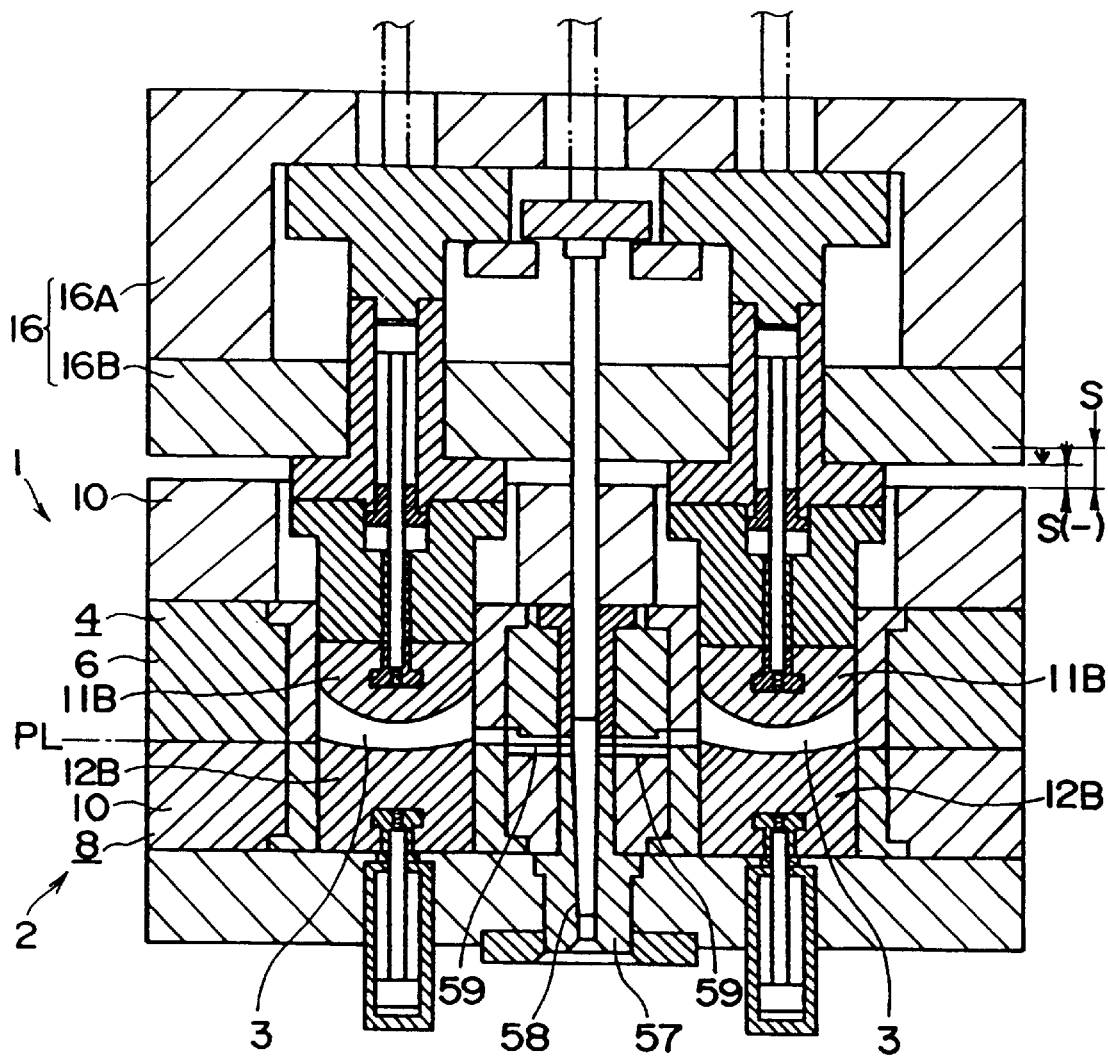
FIG. 6 is a drawing showing a state before the molten resin is injected and fed when a minus lens is formed in the above embodiment.
Figure 7:
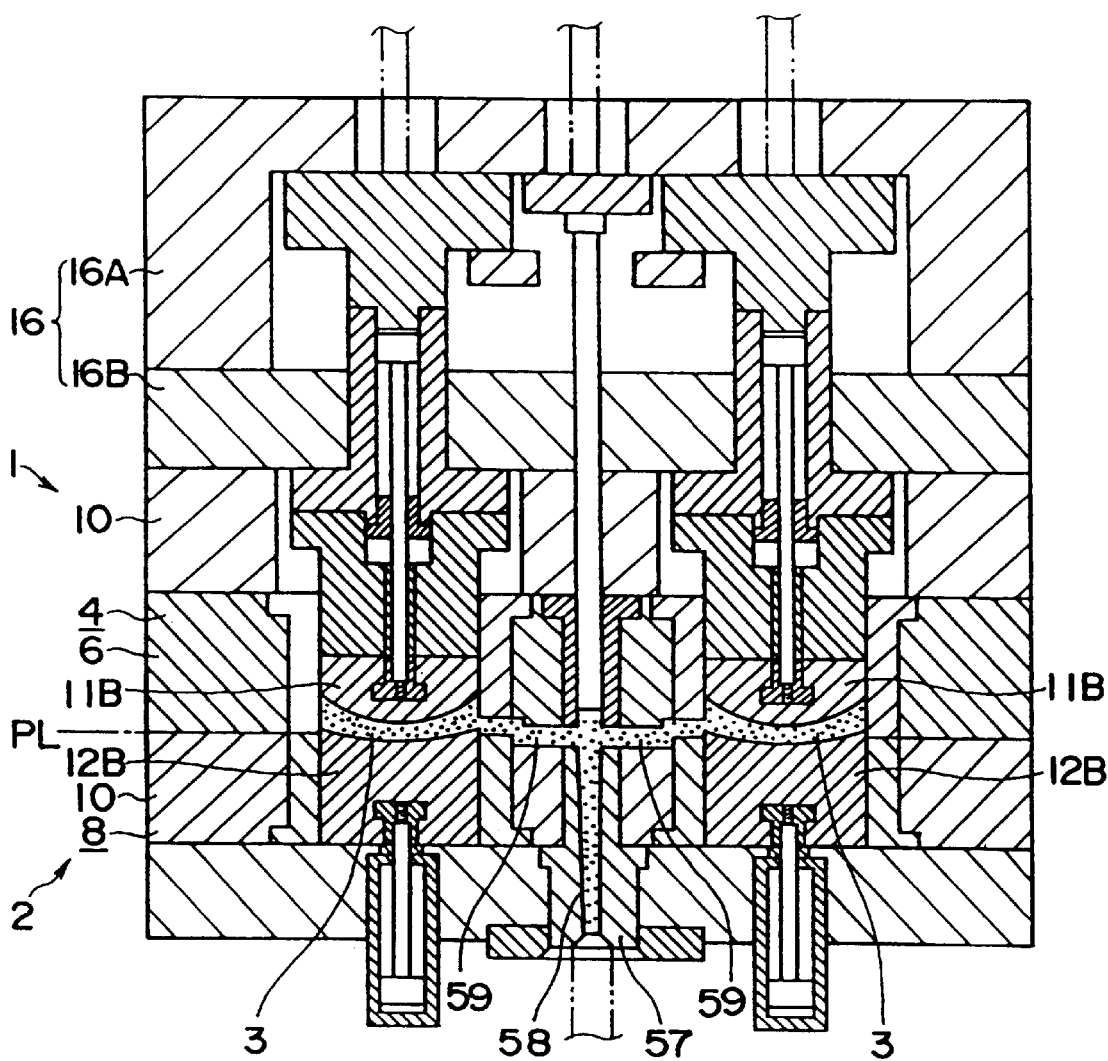
FIG. 7 is a drawing showing a state after the molten resin is compressed when the minus lens is formed in the above embodiment.

As described thus far, the inserts are changed to the inserts 11A and 12A as shown in FIGS. 4 and 5 when the plus lens (a lens having the thicker central portion than the peripheral portion) is molded, and the inserts are changed to the inserts 11B and 12B as shown in FIGS. 6 and 7 when the minus lens (a lens having the thicker central portion than the peripheral portion).

Figure 3:
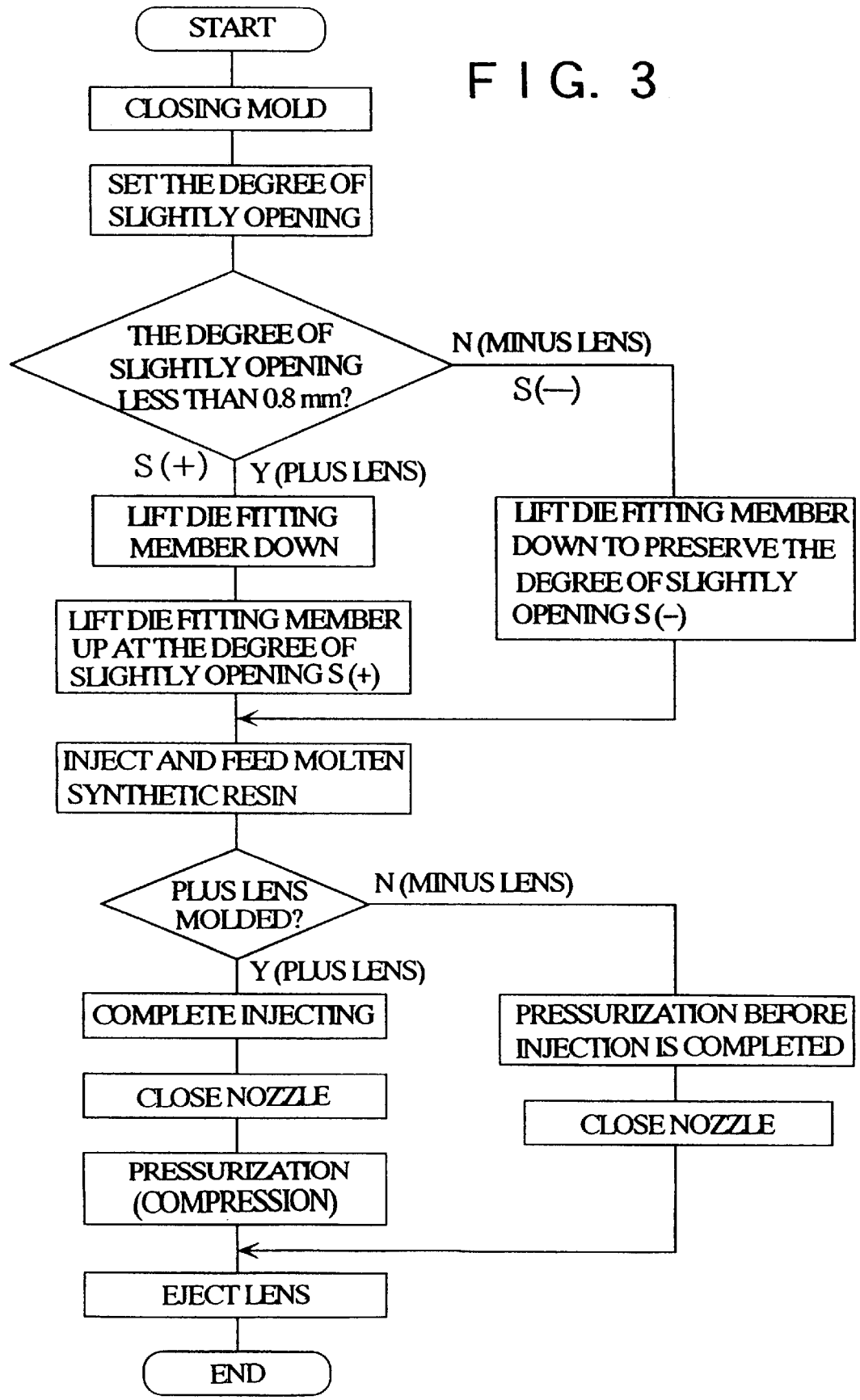
FIG. 3 is a flow chart showing molding processes in the above embodiment.

When the lens is molded, operation is advanced along a flow chart shown in FIG. 3. First, the mold is closed as a state shown in FIGS. 1 and 2. That is to say, the upper die 1 is lifted down by the clamping cylinder to touch the die plate 6 of the upper die 1 to the die plate 10 of the lower die 2 and to close the mold with a state the plate spring 17A is not compressed. In this state, the space S is adjusted at the maximum degree of slightly opening (approximate 15 mm).

Next, the degree of slightly opening (a predetermined compressing margin) is adjusted. At this time, less than 0.8 mm of the degree of slightly opening $S_{(+)}$ is adjusted when the plus lens is molded. More than 0.8 mm of the degree of slightly opening $S_{(-)}$ is adjusted when the minus lens is molded. More specifically, the predetermined compressing margin for producing the minus lens is adjusted larger than the predetermined compressing margin for producing the plus lens.

Here, when the plus lens is molded, namely, when less than 0.8 mm of the degree of slightly opening $S_{(+)}$ is adjusted, as shown in FIG. 4, the die fitting member 16 is further lifted down by the clamping cylinder (at this time, the plate spring 17A is compressed), and after the space S is completely disappeared, the die fitting member 16 is lifted up at the aforementioned degree of slightly opening $S_{(+)}$ in opposition to clamping force of the clamping cylinder by the slightly-opening cylinder to adjust the degree of slightly opening $S_{(+)}$. And when the minus lens is molded, namely, when more than 0.8 mm of the degree of slightly opening $S_{(-)}$ is adjusted, as shown in FIG. 6, the die fitting member 16 is lifted down until a position, where the aforementioned degree of slightly opening $S_{(-)}$ is preserved, by the clamping cylinder (at this time, the plate spring 17A is compressed), and is stopped at the position to adjust the degree of slightly opening $S_{(-)}$.

Next, the molten resin is injected and fed. The molten resin is injected from a nozzle of the injection molding apparatus connected to a sprue bush 57 and fed through a sprue 58 and a runner 59 into the cavity 3.

At this time, in the case the plus lens is molded (FIG. 4), the thickness of the central portion of the cavity 3 (the central portion of the lens) is larger, so that the molten resin reaching the inside of the cavity 3 reaches the peripheral portion through the central portion of the cavity 3 (the central portion of the lens). And in the case the minus lens is molded, the degree of slightly opening $S_{(-)}$ is adjusted at more than 0.8 mm, namely, the thickness of the central portion of the cavity 3 is adjusted to be large, so that the molten resin reached the inside of the cavity 3 reaches the peripheral portion through the central portion of the cavity 3 without separately flowing. Therefore, in any cases, a weld mark in the central portion is controlled.

Further, in the case the plus lens is molded (FIG. 4), after the molten resin is completed being injected, a space including the cavity 3, the runner 59 and the sprue 58 is to be a sealed space by closing the nozzle, and continuously, the molten resin is pressurized (compressed). That is to say, as shown in FIG. 5, the die fitting member 16 is lifted down at the degree of slightly opening $S_{(+)}$ by the clamping cylinder.

And in the case the minus lens is molded (FIG. 6), the molten resin is started being pressurized (compressed) before being completed being injecting. More specifically, when approximate 90–95% of the molten resin injected is injected, the pressurization is started by the clamping cylinder, and as shown in FIG. 7, the die fitting member 16 is lifted down at the degree of slightly opening $S_{(-)}$. At this time, the nozzle is closed just after the molten resin is completed being injected to cause the space including the cavity 3, the runner 59 and the sprue 58 to be the sealed space.

Then, after the plus lens or the minus lens is molded as described thus face, the lens is ejected. The die fitting member 16 of the upper die 1 is lifted up by the clamping cylinder, namely, is lifted up from the lower die 2, to open the degree of slightly opening S between the die body 4 and the die fitting member 16. At this time, the eject pin 34 is lifted down by the eject cylinder to cause the pressure receiving portion 32 to move to press downward from the die fitting member 16 by the eject pin 34. The degree of pressured movement is smaller than the degree of slightly opening S, for example, when the degree of slightly opening S is 15 mm, the degree of pressured movement is 13 mm. In other words, when the die fitting member 16 is lifted up, the insert 11 is lifted down toward the lower die 2 relatively to the die fitting member 16.

Figure 8:
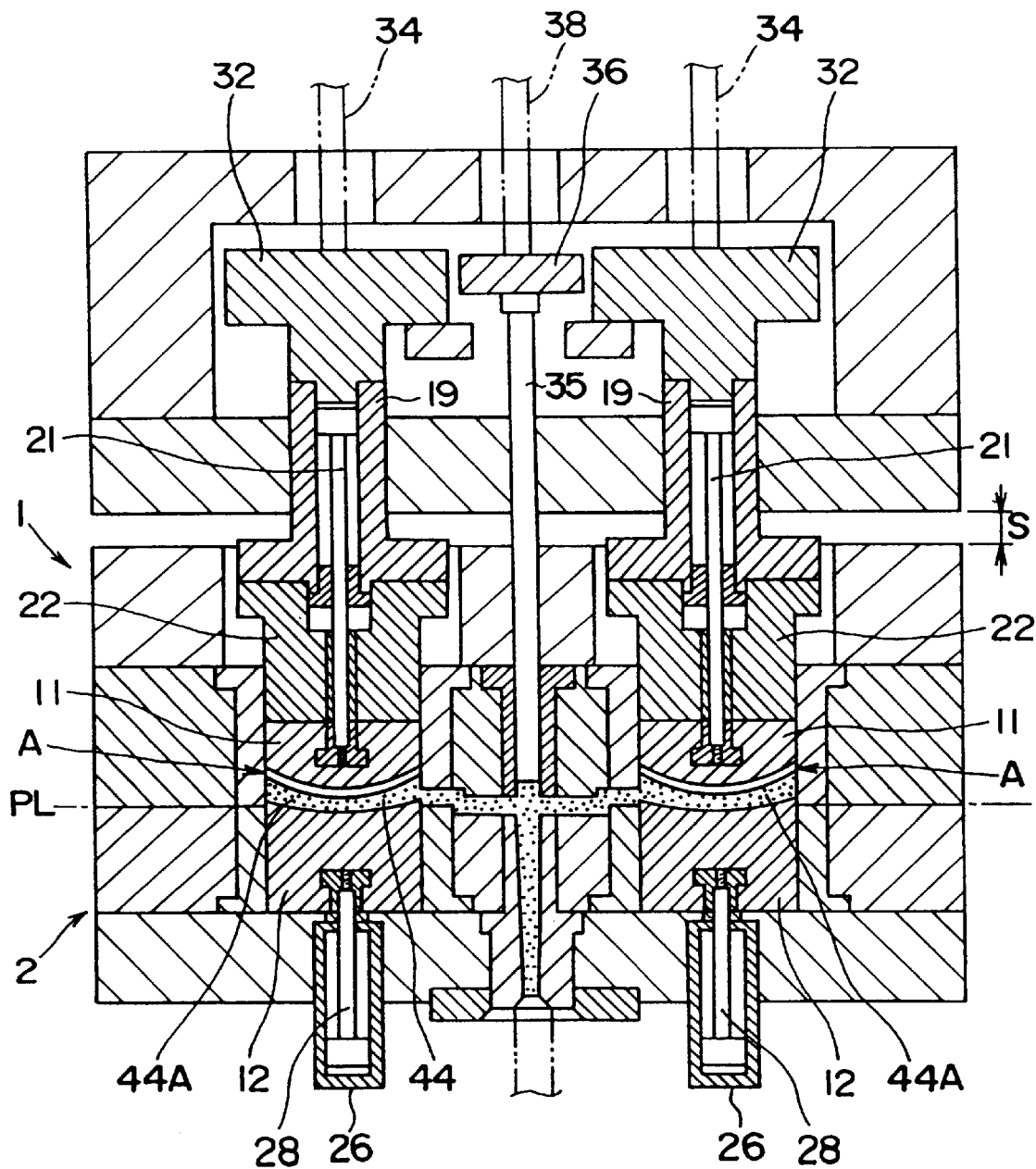
FIG. 8 is a drawing showing a state in which, in the above embodiment, a die fitting member of a upper die is lifted up from a die body at the degree of slightly opening, and an insert of the upper die is moved downward relatively to the die fitting member with an eject pin.

As a result, the degree of the upward-movement of the insert 11, which should be, originally, retracted the same distance as when the die fitting member 16 is lifted up at the distance of slightly opening S, is controlled to be smaller, for example, in molding the minus lens, as shown in FIG. 8, the insert 11 is a slightly space A, which is 2 mm when the degree of slightly opening and the degree of the pressured movement are values as described above, distant from the spectacle lens 44A as the lens-molding 44 molded in the cavity 3.

Figure 9:
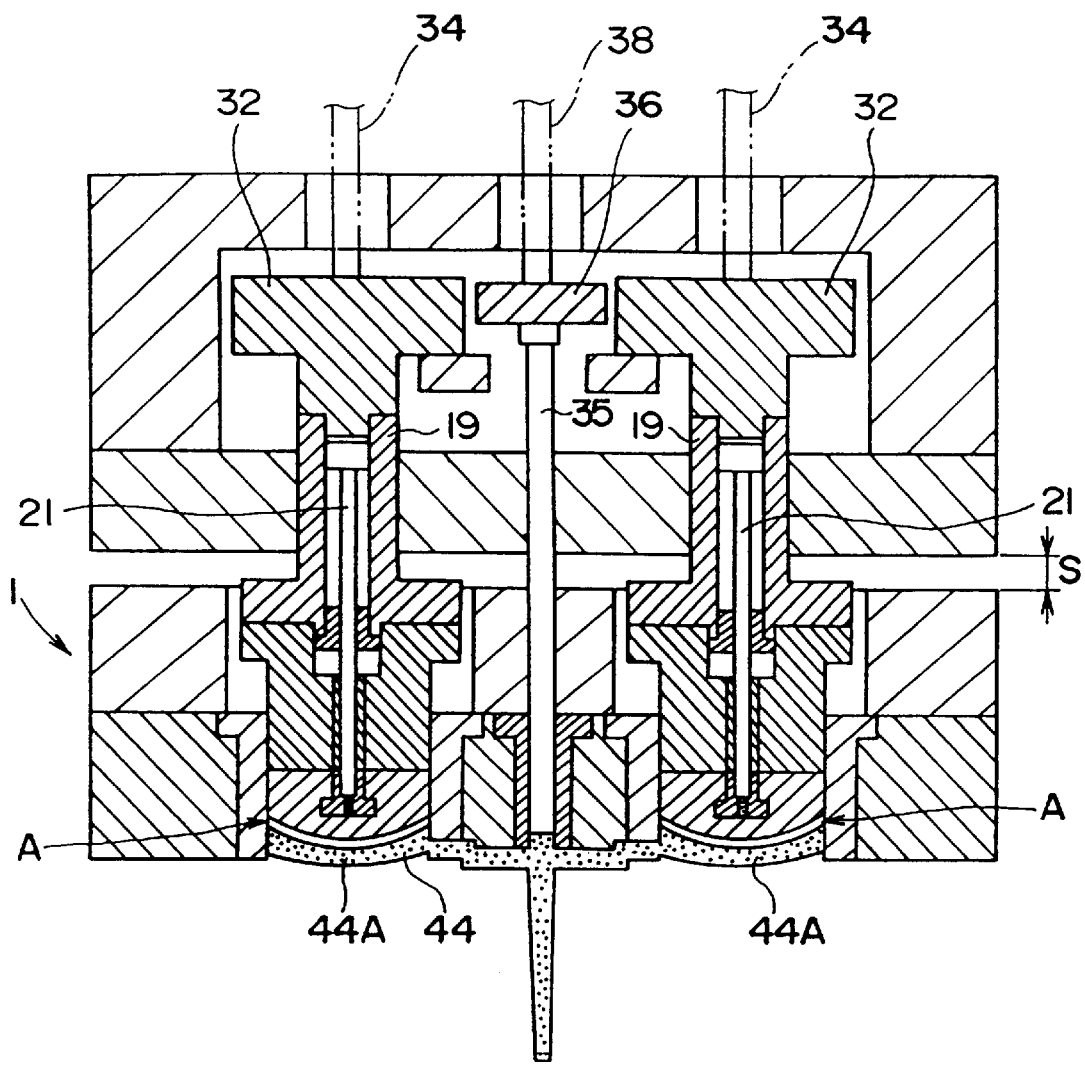
FIG. 9 is a drawing showing a state in which the upper die and a lower die are opened to separate from the state of FIG. 8.
Figure 9:
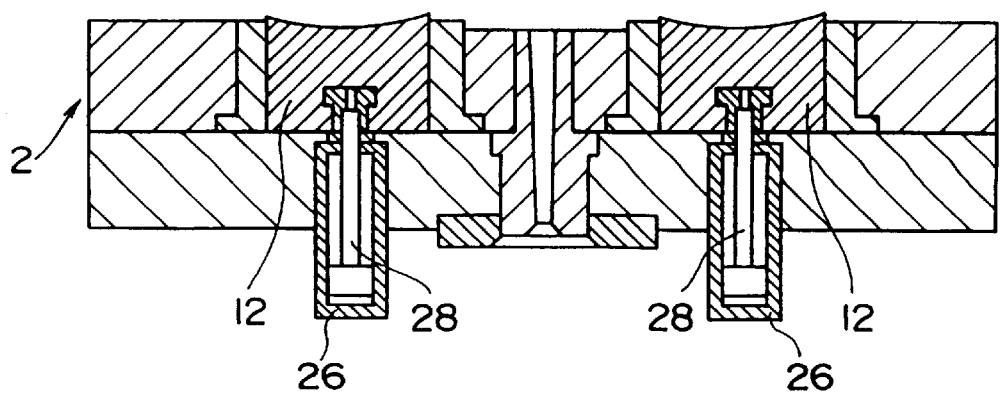

As shown in FIG. 9, the die fitting member 16 and the die body 4 of the upper die 1 are lifted up by the clamping cylinder so as to open the upper die 1 from the lower die 2 at the parting line PL. After that, a part of the lens-molding 44 exposed from the lower face of the upper die 1 is gripped by a gripping device, and further, the eject pins 34 and 38 are lifted down by each eject cylinder, thereby the pressure receiving portions 32 and 36 are moved to be pressed, naturally, the lens-moldings 44 are pushed out with the insert 11 and the eject bar 35. At this time the lens-molding 44 is pushed out, the insert 11 is only the space A distant from the spectacle lens 44A of the lens-molding 44, so that air entering the space A is not compressed until becoming large pressure by the insert 11, with the result that the lens-molding 44.can be pushed out from the upper die 1 without the influence of the large pressure of the compressed air upon the spectacle lens 44A.

More specifically, when the die fitting member 16 of the upper die 1 is lifted up at the degree of slightly opening S from the die body 4, the pressure receiving portion 32 is not moved downward to be pressed by the eject pin 34, and further when the insert 11 is not lifted down relatively to the die fitting member 16, the space having the same degree as the degree of slightly opening S is formed between the spectacle lens 44A of the lens-molding 44 and the insert 11, so that the excessive high-pressure air influences the spectacle lens 44A as a precise molding portion by greatly compressing air in the space when the spectacle lens 44A is pushed out with the insert 11, however, in the embodiment according to the present invention, a slight space A is formed between the spectacle lens 44A and the insert 11, so that the molding 44 can be pushed out with controlling to excessively produce the compressed air when the spectacle lens 44A of the lens-molding 44 is pushed out with the upper insert 11, with the result that the precise molding state of the spectacle lens 44A is ensured without parts of molded in the spure or the runner are bent or fault brought when the molding is removed from the mold, such as the displacement of the molding to the mold is produced.

According to the embodiment, the degree of slightly opening $S_{(-)}$ for producing the minus lens is adjusted to be larger than the degree of slightly opening $S_{(+)}$ for producing the plus lens, thereby the molten resin reached the inside of the cavity 3 flows through the central portion of the cavity 3 into the peripheral portion without separately flowing when the minus lens is molded, so that appearance of a weld mark in the central portion is avoided. Therefore, the plus lens and the minus lens, regardless of kinds of lens, can be molded with a high degree of precision and high quality.

At this time, the degree of slightly opening $S_{(-)}$ for producing the minus lens is needed to be adjusted to be larger than the degree of lightly opening $S_{(+)}$ for producing the plus lens, but by lifting the die fitting member 16 of the upper die 1 down from the initial position where the degree of slightly opening S is maximum until the position where the degree of slightly opening $S_{(-)}$ is preserved, the degree of slightly opening $S_{(-)}$ is adjusted, with the result that the degree of slightly opening $S_{(-)}$ can be swiftly adjusted with a high degree of precision.

Further, the degree of slightly opening $S_{(+)}$ for producing the plus lens is smaller than the degree of slightly opening $S_{(-)}$ producing the minus lens, therefore the die fitting member 16 of the upper die 1 is opened at the degree of slightly opening $S_{(+)}$ after being lifted down from the initial position where the degree of slightly opening S is maximum until the position where the degree of slightly opening S is disappeared, thereby the degree of slightly opening $S_{(+)}$ is adjusted, with the result that the degree of slightly opening $S_{(+)}$ can be swiftly adjusted with a high degree of precision.

In molding the minus lens, due to the fact that the volume in the cavity 3 becomes reduced before the injection of the molten resin is completed by starting compressing for the degree of slightly opening $S_{(-)}$ before the injection of the molten resin is completed, a large non-fed part in the cavity is not much retained at the time the injection and feed of the molten resin is completed, therefore the appearance of the flow mark is avoided. That is to say, provided that the degree of slightly opening $S_{(+)}$ is adjusted to be large, the flow of the molten resin is stopped while the large non-fed part is retained in the cavity at the time the injection and feed of the molten resin is completed, thereby a disadvantage that a flow mark is easily appeared on a critical portion of a fed part and the non-fed part is considered, however, with the processes of the embodiment, the appearance of the flow mark is avoided.

When the die fitting member 16 of the upper die 1 is lifted up from the lower die 2, the holding member, holding the insert 11 provided in the die body 4 of the upper die 1 is moved to be pressed toward the lower die 2 with the eject pin 34 to cause the insert to lift down toward the lower die 2 relatively to the die fitting member 16, so that when the lens-molding 44 is pushed out with the insert 11, it can be pushed out while the product of the compressed air is controlled, therefore, the pressure of air compressed with high-pressure has an influence on the lens-molding 44, with the result that the lens-molding 44 can be pushed out while a molding precision of the lens-molding 44 molded with a high degree of precision is ensured.

In the case that the die fitting member 16 of the upper die 1 is lifted up from the die body 4 at the degree of slightly opening S, when the insert 11 is lifted down relatively to the die fitting member 16 by moving the pressure receiving portion 32 to press downward with the eject pin 34, the degree of the downward-movement is defined to be smaller than the degree of the upward-movement (the degree of slightly opening S) of the die fitting member 16, so that the space can be formed between the insert 11 and the spectacle lens 44A of the lens-molding 44. Therefore, even when the upper die 1 is opened from the lower die 2, the lens-molding 44 does not fall from the cavity 3, resulting in the prevention of damaging the lens-molding 44 by falling.

Furthermore, in the embodiment, the two cavities 3 are formed by the insert 11 and the like, and the holding member of the insert 11, composed of the back insert 22, the hydraulic cylinder 19 and the pressure receiving portion 32, is supplied with the elastic urging force upward by the spring 40 to be independent of each insert 11, therefore even when the spring 40 of each insert 11 has a different force caused by the spring, the structure is not under the influence of the force caused by the spring, however, the eject pin 34 is provided to each insert 11, namely, each holding member of the insert 11, so that the holding member independent of one another can be moved to be pressed downward with the specified way by the eject pin 34, with the result that two spectacle lenses 44A of the lens-moldings 44 can be pushed out with the two inserts 11.

In the embodiment described thus far, it is intended that the predetermined compressing margin is adjusted dependent upon the degree of slightly opening which is formed between the die body 4 and the die fitting member 16, but another mold may be used. For example, a mold, having a structure in which the predetermined compressing margin is adjusted from the position of a cavity core provided to be projected into the cavity 3, and the compression is carried out by projecting the cavity core into the cavity 3.

In the aforementioned embodiment, the degree of slightly opening is defined to be a size less than 0.8 mm when the plus lens is molded and more than 0.8 mm when the minus lens is molded, but the values can be selectively defined dependence upon the lens properties.

And, in the aforementioned embodiment, it is intended that the compression for the degree of slightly opening $S_{(-)}$ is started at the time approximate 90–95% of the molten resin is injected when the minus lens is molded, but this percentage may be selectively defined dependence upon the volume of the cavity 3, kinds of resin, the lens properties and so on.

Further, in the aforementioned embodiment, it is intended that the eject pin 34 is moved downward in two steps to be simultaneous with when the die fitting member 16 of the upper die 1 is lifted up from the die body 4 at the degree of slightly opening S and when the mold is opened to separate the die body 4 from the lower die 2, but when the movement for slightly opening the die fitting member 16 by the clamping cylinder and the movement for opening the mold to separate the die body 4 from the lower die 2 are continuously carried out, the eject pin 34 is continuously moved downward, thereby the degree of the downward-movement of the insert 11 against the die fitting member 16 is defined to be larger, and the lens-molding 44 may be pushed out as it is.

According to the injection compression molding method of the spectacle lens of the present invention, the predetermined compressing margin for producing the minus lens is adjusted to be larger than the predetermined compressing margin for producing the plus lens, with result that the appearance of the weld mark in the central portion is avoided even when the minus lens is molded, and naturally, the plus lens and the minus lens can be molded with a high degree of precision and with high quality, regardless of the shape properties of the lens.

The predetermined compressing margin for producing the minus lens is adjusted by closing the mold from the initial position, where the compressing margin in the cavity 3 is maximum, until the position, where the aforementioned compressing margin is preserved, resulting in prosecution of the efficient adjustment.

Further, when the minus lens is molded, the compression of the aforementioned compressing margin is started before the injection of the molten resin is competed, so that the large non-fed part is not much retained in the cavity at the time the injection of the molten resin is completed, therefore, the appearance of the flow mark can be avoided.

When the die fitting member of the movable die is retreated from the stationary die, the holding member, holding the insert provided in the die body of the movable die, is moved to be pressed toward the stationary die with the eject pin to cause the insert to advance toward the stationary relatively to the die fitting member, so that the lens-molding can be pushed out while the product of the compressed air is controlled when the lens-molding is pushed out with the insert. Therefore, the pressure of air compressed with high pressure does not have influence on the lens-molding, with the result that the operation the lens-molding is pushed out can be carried out while a molding precision of the lens-molding 44 molded with a high degree of precision is ensured. Naturally, the processes from the injection to the removal from the mold can be efficiently carried out.

Further, according to the spectacle lens of the present invention, the spectacle lens is obtained by using the injection compression molding, in which the spectacle lens is molded with the injection and the compression to define the predetermined compressing margin for producing the minus lens, having the thinner central portion than the peripheral portion, to be larger than the predetermined compressing margin for producing the plus lens, having the thicker central portion than the peripheral portion, resulting in the spectacle lens superior to the optical properties with a high degree of precision, high quality and uniform quality.

What is claimed is:

1. A method of injection compression molding a spectacle lens using an injection molding machine having: a stationary die; a movable die that is opened and closed relative to the stationary die, the movable die including a die fitting member and a die body separate from the die fitting member that are movable toward the stationary die, the die body positioned to close against the stationary die; an insert guide provided inside the die body; an exchangeable insert movably positionable in the insert guide; a cavity for molding the lens, the cavity being formed by the stationary die, the die body and the insert; a sprue and a runner through which molten resin is supplied into the cavity; a holding member for holding the insert; a resilient member for constantly biasing the holding member in a direction opposite to the stationary die so that the holding member abuts the die fitting member; and an eject pin that is selectively insertable in the die fitting member against the holding member for moving the holding member and the insert towards the stationary die, the method comprising the steps of:

closing the mold by advancing the die fitting member to the stationary die so that the die body of the movable die closes against the stationary die;

simultaneously with said mold closing step or after completion of said mold closing step, setting a predetermined compression margin in the cavity by setting the position of the insert;

injecting the molten resin through the sprue and the runner to fill the cavity;

compressing the molten resin by advancing the die fitting member toward the stationary die to form the lens, wherein:

when a minus-lens having a thinner central portion than a peripheral portion is molded, said compressing step is started before completion of said molten resin injection step; and when a plus-lens having a thicker central portion than a peripheral portion is molded, said compressing step is started simultaneously with or after completion of said molten resin injection step; and separating the movable die from the stationary die by retracting the die fitting member; and after said step of separating the movable die, ejecting the lens molding by pushing the holding member toward the stationary member with the eject pin, wherein:

when the minus-lens is molded, the predetermined compression margin is set larger than the predetermined compression margin for molding a plus-lens, and said step of setting the predetermined compression margin for molding the minus-lens is performed by advancing the die fitting member from an initial position having a maximum compression margin to a position where the predetermined compression margin is less than the maximum compression margin; and when the plus-lens is molded, said step of setting the predetermined compression margin is performed by advancing the die fitting member from the initial position where the compression margin is at the maximum, to a position at which there is no compression margin and by then retracting the die fitting member a distance equal to the predetermined compression margin; and, the predetermined compression margin is defined in accordance with a lens factor of the lens.

2. The injection compression molding method a spectacle lens according to claim 1, wherein the cavity, the sprue and the runner are sealed closed after completion of said molten resin injection step.

3. The injection compression molding method a spectacle lens according to claim 1, wherein the holding member and insert are advanced toward the stationary die with said retraction of the die fitting member so that the insert is advanced towards the stationary die relative to the die fitting member.

4. The injection compression molding method for spectacle lens according to claim 3, wherein, in said step of advancing the holding member and the insert, the insert is advanced a shorter distance than the distance the die fitting member is retracted so as to define a separation distance between the insert and the lens.

5. The injection compression molding method for spectacle lens according to claim 4, wherein said holding member and the insert are advanced so the separation distance between the insert and the lens is between 1 and 4 mm.

6. A method of injection compression molding a meniscus-shaped spectacle lenses using an injection molding machine having: a stationary die; a movable die that is opened and closed relative to the stationary die, the movable die including a die fitting member and a die body that is separate from the die fitting member and that is positioned to close against the stationary die; insert guides provided inside the die body; an exchangeable optical insert movably fitted to each insert guide; plural cavities for molding lenses, each cavity being formed by the stationary die, the die body and one of the optical inserts; a sprue and a runner through which molten resin is supplied into the cavities; an injection nozzle for injecting the molten resin into the sprue and the runner; separate holding members for holding each insert; resilient members for constantly biasing the holding members in a direction opposite to the stationary die so that the holding members abut the die fitting member; and plural eject pins selectively insertable in the die fitting member against the holding members for moving the holding members and the inserts towards the stationary die, the method comprising the steps of:

closing the mold by advancing the die fitting member to the stationary die so that the die body closes against the stationary die;

simultaneously with said mold closing step or after completion of said mold closing step, setting a predetermined compression margin in the cavities by setting the position of the inserts;

injecting the molten resin from the injection nozzle through the sprue and the runner so that the molten resin simultaneously flows into the cavities; and compressing the molten resin by advancing the die fitting member toward the stationary die to form the lenses, wherein:

when minus-lenses having a thinner central portion than a peripheral portion is molded, said compressing step is started prior to completion of said molten resin injection step; and when plus-lenses having a thicker central portion than a peripheral portion is molded, said compressing step is started simultaneously with or after completion of said molten resin injection step;

after completion of said molten resin injection step, closing the injection nozzle so that the cavities, including the spaces therein, the sprue and runner are sealed; and separating the movable mold from the stationary mold and ejecting the molded lens from the die, wherein, when a minus-lens having is molded, the predetermined compression margin is set larger than when a plus-lens is molded, and the predetermined compression margin is defined in accordance with a lens factor of the lens.

7. The injection compression molding method for a meniscus-shaped spectacle lens according to claim 6, wherein:

when minus-lenses are molded, the predetermined compression margin is defined by advancing the die fitting member from an initial position having a maximum initial compression margin to a position that defines the predetermined compression margin; and when the plus-lenses are molded, the predetermined compression margin is defined by advancing the die fitting member from the initial position having the maximum compression margin, to a position where there is no compression margin and by retracting the die fitting member a distance equal to the predetermined compression margin.

* * * * *